July 2, 1957

H. L. FORGASH 2,797,562

COUPLING

Filed Dec. 28, 1954

Herbert L. Forgash
INVENTOR.

BY *Clarence A. O'Brien*
*and Harvey B. Jacobson*
Attorneys

United States Patent Office 2,797,562
Patented July 2, 1957

2,797,562
COUPLING
Herbert L. Forgash, Michigan City, Ind.
Application December 28, 1954, Serial No. 478,153
4 Claims. (Cl. 64—11)

This invention relates in general to new and useful improvements in flexible couplings between electric motors and driven shafts, and more specifically to an improved connection between a flexible member of such coupling and a connector thereof.

In the construction of certain types of flexible couplings, flexible tubular members, such as rubber-like tubing, is utilized to obtain the desired flexibility. However, in order to connect the tubing to machinery, such as electric motors and the like, it is necessary to provide the opposite ends of such tubing with connectors. It is therefore the primary object of this invention to provide an improved connection between a connector and a resilient tubular member which is so constructed whereby the connection between the connector and the tubular member will sustain any torque which may be imposed thereon by the motor for which it is designed.

Another object of this invention is to provide an improved connection between a connector and an end of a resilient tubular member, the connection being of such a nature whereby it may be readily made with a minimum of special tools.

A further object of this invention is to provide an improved connection between a connector and a resilient tubular member, the connection utilizing a collar to clamp an end of the tubular member to a spline shaft, the collar frictionally gripping the end of the tubular member and being so connected to the connector whereby relative twisting or rotation therebetween is prevented.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
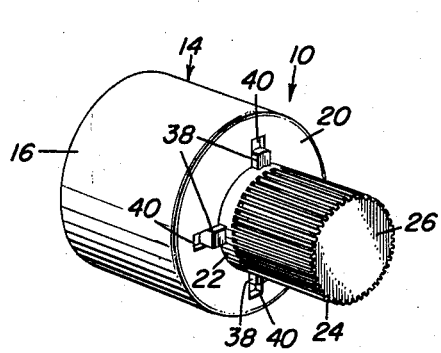
Figure 3 is a perspective view of the connector as viewed from the tubular member end thereof.

Referring now to the drawings in detail, it will be seen that there is illustrated the subject of this invention which is in the form of a desired connection between a connector, which is referred to in general by the reference numeral 10 and a resilient tubular member 12. As is best illustrated in Figure 3, the connector 10 includes an adapter portion 14 which includes a generally cylindrical body portion 16. Formed on the interior of the body portion 16 are longitudinally extending, circumferentially spaced ribs 18 for non-rotatably connecting the adapter portion 14 to a drive member (not shown). The adapter portion 14 also includes an annular end wall 20. Extending from the end wall 20 and preferably formed integral therewith is a shaft 22 of which the major portion thereof is externally splined with suitable splines 24. The end of the shaft 22 remote from the end wall 20 is reinforced by an end wall 26.

Figure 4:
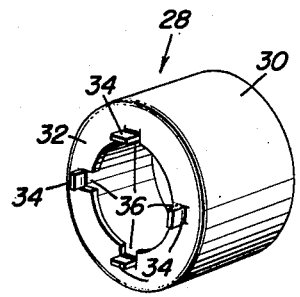
Figure 4 is a perspective view of a collar associated with the connector, as viewed from the connector end thereof.

Referring now to Figure 4 in particular, it will be seen that there is illustrated a collar which is referred to in general by the reference numeral 28. The collar 28 includes a generally cylindrical body portion 30 and an end wall 32. Struck from the end wall 32 adjacent the innermost periphery thereof is a plurality of circumferentially spaced tabs 34. The tabs 34 are so struck from the end wall 32 whereby circumferentially spaced, radiating recesses 36 are formed.

In order that the collar 28 may be suitably secured to the adapter portion 14 of the connector 10, there is provided a plurality of radiating, circumferentially spaced lugs 38 disposed at the intersection between the end wall 20 and the shaft 22. The lugs 38 are so arranged and are of such a size as to snugly fit in the recesses 36 to prevent relative rotation between the collar 28 and the adapter portion 14.

Disposed immediately radially outwardly of the lugs 38 are suitable openings 40 in the end wall 20. The openings 40 are so spaced to receive the tabs 34.

Figure 1:
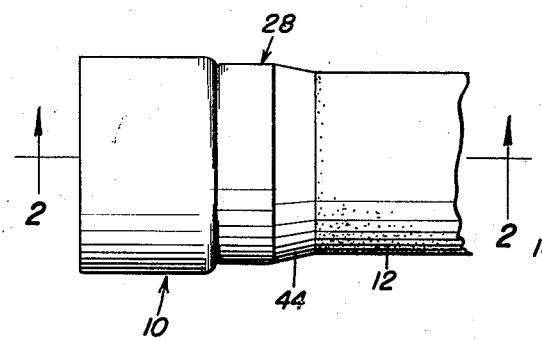
Figure 1 is a side elevational view of the connection which is the subject of this invention, an end portion only of the tubular member being illustrated.
Figure 2:
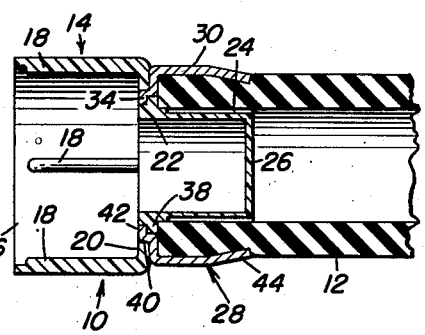
Figure 2 is a longitudinal sectional view taken substantially upon the plane indicated by the section line 2—2 of Figure 1 and shows the connection between the connector and the tubular member.

As is best illustrated in Figure 2, the end wall 20 is provided with a plurality of recesses 42 which communicate with the openings 40. The recesses 42 are so disposed whereby they are positioned rearwardly of the lugs 38. When the collar 28 is attached to the connector 10, the tabs 34 are passed through the openings 40 and then crimped over into the recesses 42, as is best illustrated in Figure 2. Thus the crimped over ends of the tabs 34 are recessed in the end wall 20 and the end wall 20 is retained in face to face engagement with the end wall 32.

After the collar 28 has been attached to the connector 10, the shaft 22 is slid into one end of the tubular member 12. Then the free edge of the body portion 30 is deformed as at 44 in Figure 2 to clamp against the outer surface of the tubular member 12. Inasmuch as the tubular member 12 is resilient and preferably formed of a rubber-like product, it will be seen that the formed portion of the collar 28 will be partially embedded in the outer part of the tubular member 12 so as to form a very good grip between the tubular member 12 and the collar 28. Also, the end part of the tubular member 12 is deformed so that it intermeshes with the splines 24 thereby forming a rigid connection between the end of the tubular member 12 and the shaft 22. This connection is sufficient to restrain the torsion latching of a relatively large size commercial motor for small industrial uses and at the same time it is relatively simple in structure and easily formed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A driving joint between a resilient tubular drive member and a connector, said connector including an adapter portion and an elongated shaft portion, said shaft portion being externally splined and received in one end of said tubular member, and a collar telescoped over said one end and compressing the interior of said one end into meshing relation with said splines, means connecting said collar to said adapter portion against longitudinal movement, said adapter portion having an end wall carrying said shaft portion, said means being in the form of tabs on said collar passing through said end wall and clinched thereagainst, said collar and said adapter portion having a splined connection preventing relative rotation.

2. A driving joint between a resilient tubular drive member and a connector, said connector including an adapter portion and an elongated shaft portion, said shaft portion being externally splined and received in one end of said tubular member, and a collar telescoped over said one end and compressing the interior of said one end into meshing relation with said splines, means connecting said collar to said adapter portion against longitudinal movement, said adapter portion having an end wall carrying said shaft portion, said means being in the form of tabs on said collar passing through said end wall and clinched thereagainst, said collar and said adapter portion having a splined connection preventing relative rotation, said splined connection including lugs projecting from said end wall and recesses formed in said collar receiving said lugs.

3. A driving joint between a resilient tubular drive member and a connector, said connector including an adapter portion and an elongated shaft portion, said shaft portion being externally splined and received in one end of said tubular member, and a collar telescoped over said one end and compressing the interior of said one end into meshing relation with said splines, means connecting said collar to said adapter portion against longitudinal movement, said adapter portion having an end wall carrying said shaft portion, said means being in the form of tabs on said collar passing through said end wall and clinched thereagainst, said collar and said adapter portion having a splined connection preventing relative rotation, said splined connection including lugs projecting from said end wall and recesses formed in said collar receiving said lugs, said tabs being struck from said recesses.

4. A driving joint between a resilient tubular drive member and a connector, said connector including an adapter portion and an elongated shaft portion, said shaft portion being externally splined and received in one end of said tubular member, and a collar telescoped over said one end and compressing the interior of said one end into meshing relation with said splines, means connecting said collar to said adapter portion against longitudinal movement, said adapter portion having an end wall carrying said shaft portion, said means being in the form of tabs on said collar passing through said end wall and clinched thereagainst, said collar and said adapter portion having a splined connection preventing relative rotation, said splined connection including lugs projecting from said end wall and recesses formed in said collar receiving said lugs, said tabs being struck from said recesses, said tabs being seated behind said lugs and recessed in said end wall.

References Cited in the file of this patent

UNITED STATES PATENTS

| | | |
|---|---|---|
| 1,954,989 | Eastman | Apr. 17, 1934 |
| 2,170,627 | Berryman | Aug. 22, 1939 |
| 2,174,010 | Patterson | Sept. 26, 1939 |